United States Patent [19]

Ghosh

[11] Patent Number: 5,572,249
[45] Date of Patent: Nov. 5, 1996

[54] METHOD AND APPARATUS FOR OPTIMAL NTSC REJECTION FILTERING AND TRANSMITTER AND RECEIVER COMPRISING SAME

[75] Inventor: Monisha Ghosh, Mohegan Lake, N.Y.

[73] Assignee: Philips Electronics North America Corporation, New York, N.Y.

[21] Appl. No.: 271,810

[22] Filed: Jul. 7, 1994

[51] Int. Cl.⁶ .................... H04N 7/00; H04N 7/13
[52] U.S. Cl. .................... 348/21; 348/470; 348/613; 348/608; 348/725; 375/346
[58] Field of Search .................... 348/21, 470, 487, 348/426, 608, 611, 612, 613, 614, 624, 606, 571, 708, 711, 725–727, 728, 909, 607, 627, 723; 375/103, 99, 58, 60, 350, 285, 296, 346; 364/724.01, 724.12; 455/295, 296, 307; H04N 7/00, 7/13

[56] References Cited

U.S. PATENT DOCUMENTS

| | | | |
|---|---|---|---|
| 3,652,998 | 3/1972 | Forney, Jr. | 371/72 |
| 5,031,194 | 7/1991 | Crespo et al. | 375/14 |
| 5,086,340 | 2/1992 | Citta et al. | 358/141 |
| 5,087,975 | 2/1992 | Citta et al. | 358/183 |
| 5,121,203 | 6/1992 | Citta | 358/141 |
| 5,162,900 | 11/1992 | Citta | 348/607 |
| 5,214,501 | 5/1993 | Cavallerno et al. | 348/488 |
| 5,263,051 | 11/1993 | Eyuboglu | 375/58 |
| 5,272,533 | 12/1993 | Akiyama et al. | 348/624 |
| 5,282,019 | 1/1994 | Basile et al. | 348/473 |
| 5,282,023 | 1/1994 | Scarpa | 348/624 |
| 5,291,289 | 3/1994 | Hulyalkar et al. | 348/469 |
| 5,361,102 | 11/1994 | Roy et al. | 348/614 |
| 5,386,239 | 1/1995 | Wang et al, | 348/470 |

OTHER PUBLICATIONS

Lee–Fang Wei, "Precoding Technique For Partial–Response Channels with Applications to HDTV Transmission", IEEE Journal on Selected Areas in Communications, vol. 11, No. 1, Jan. 1993, pp. 127–135.
"VSB Transmission System", Zenith Electronics Corporation, Dec. 17, 1993, Technical Details.
Zenith "Technical Details", Digital Spectrum Compatible, Sep. 23, 1991.

*Primary Examiner*—Safet Metjahic
*Attorney, Agent, or Firm*—Michael E. Marion

[57] ABSTRACT

The invention comprises an optimal causal, monic (first coefficient of filter is 1) NTSC rejection filter for use at an ATV receiver which is designed to optimally process the interference caused by an NTSC co-channel signal while keeping the noise enhancement to a desirably low value. In other words, the design method gives the filter with the BEST NTSC rejection capability for a given noise enhancement.

2 Claims, 5 Drawing Sheets

METHOD AND APPARATUS FOR OPTIMAL NTSC REJECTION FILTERING AND TRANSMITTER AND RECEIVER COMPRISING SAME

BACKGROUND OF THE INVENTION

The Federal Communications Commission and cable television testing organizations such as CableLabs have been evaluating digital television delivery systems in order to choose a new television "standard" which someday will replace NTSC in the United States. These systems all involve digital coding and data compression techniques, for example those utilizing the MPEG algorithms or variations thereof.

The FCC plans to test and approve an advanced television (ATV) standard comprising for example, high definition television (HDTV) and standard definition (SDTV) digital signals for terrestrial broadcasting in 1995, and although the specifics of the standard are yet to be fully tested and agreed upon, the FCC has indicated that the system will initially take the form of a so called "simulcast" approach.

The new ATV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonomously with "conventional" to represent conventional television in general.

In 1995 the FCC will test the so-called "Grand Alliance" system which is a proposed system being cooperatively developed by the corporate sponsors which developed the first round of individual proposals which were tested by the FCC in 1991 and 1992. This Grand Alliance system proposes to take the best features from those systems already tested in order to present a single optimum system for FCC approval as the U.S. standard.

The Grand Alliance has already decided on a coding algorithm which will comply with the source coding standards proposed by MPEG (Motion Pictures Experts Group). In addition, the RF transmission scheme selected by the Grand Alliance is the trellis coded 8VSB system designed and built by Zenith Electronics. Details of the Zenith VSB system are described in "Digital Spectrum Compatible—Technical Details", Sep. 23, 1991 and more recently modified and described in "VSB Transmission System: Technical Details", Feb. 18, 1994, which are incorporated by reference herein.

The technique used in the Zenith 8VSB modem to combat co-channel interference is as follows. A comb filter is used in the digital (e.g. HDTV) signal receiver to introduce nulls in the digital spectrum at the frequency locations of the conventional (e.g. NTSC) picture, color and the sound carriers. This provides a significant improvement in performance when conventional television, e.g. NTSC, is broadcast on a co-channel.

When co-channel interference from an NTSC signal is present at the HDTV receiver, the comb filter at the receiver is treated as a partial response channel in cascade with the trellis coder. An optimum decoder can then be developed which uses Viterbi decoding on an expanded trellis, the states of which correspond to the cascade of the states of the comb-filter and the trellis coder as described in "Principles of Digital Communication and Coding" authored by A. J. Viterbi and J. K. Omura and published by McGraw Hill in 1979, which is incorporated by reference herein.

For a comb-filter with a delay of 12 symbols, the number of trellis states are extremely large. To simplify their design, Zenith converts the MPEG coded and RS coded and interleaved data-stream from serial to parallel, then uses 12 parallel trellis encoders followed by a parallel to serial converter at the transmitter. The trellis decoder for the case when the comb filter is used, implements Viterbi decoding on a trellis with the number of states equal to two or four times the number of states of the trellis encoder. This is described in detail in "VSB Transmission System: Technical Details".

For the case when co-channel conventional television interference is absent, Viterbi decoding is implemented on a trellis with the number of states equal to the number of states of the trellis encoder. This is possible since pre-coding is not used in the transmitter.

The choice between the path afforded by simple trellis decoding or of that using the comb filter and the expanded trellis at the receiver is decided by the measured error-rate of the periodically sent data field sync symbols at the outputs of the post-comb filter and with no post-comb filter.

When both co-channel and AWGN (additive white Gaussian noise) are present however, the performance of the comb filter degrades dramatically. This is because the AWGN after the comb filter does not remain white, but gets "colored", in other words the noise samples are not independent of each other. This affects the performance of the trellis decoder which is optimized for performance in an AWGN channel. Since the co-channel conventional television interference is maximum at the fringe area where the signal power is small and hence the AWGN is large, this is indeed a scenario which must be taken into account. A first objective of the instant invention is therefore to improve the performance of an ATV receiver when co-channel interference and a high AWGN level are present.

The number of states of the trellis encoder is limited by the fact that the Viterbi decoder for the comb-filter path must operate on a trellis with at least double the number of states of the trellis encoder. This limits the AWGN performance of the trellis encoder/decoder when co-channel television interference is not present. A second object of the instant invention therefore is to improve the AWGN performance of the trellis encoder/decoder in an ATV receiver when co-channel television interference is not present.

The comb filter method of NTSC rejection requires the ATV spectrum to be shifted 45.8 khz with respect to the NTSC spectrum in order to align the nulls of the comb filter with the picture and color carriers as described in "VSB Transmission System: Technical Details". This causes the digital spectrum to spill over into the adjacent 6 Mhz channel which is undesirable for adjacent channel rejection. Another object of the invention is to do away with this frequency offset.

Finally, the switching between the use of a comb filter in the receiver or not, suggested by Zenith is cumbersome. A significant number of computations must be performed to determine whether the comb filter should be used or not. Furthermore the use of the comb filter also specifies the use of 12 parallel encoders and correspondingly 12 parallel decoders which also is cumbersome. Another object of the invention therefore is to avoid the use of a comb filter at the receiver.

In addition to other documents cited herein, this application incorporates by reference the following documents:

U.S. Pat. Nos. 5,086,340, 5,087,975 and 5,121,203 and U.S. Ser. Nos. 08/170,471, filed Dec. 20, 1993 and 08/197,773, filed Feb. 10, 1994.

SUMMARY OF THE INVENTION

The invention comprises an optimal causal, monic (first coefficient of filter is 1) NTSC rejection filter for use at an ATV receiver which is designed to optimally process the interference caused by an NTSC co-channel signal while keeping the noise enhancement to a desirably low value. In other words, the design method gives the filter with the BEST NTSC rejection capability for a given noise enhancement.

The invention described in U.S. application Ser. No. 08/170,471 (assigned to the instant Assignee), provides a design method that attenuates just the picture and sound carriers of the NTSC interference. The method however is not necessarily optimal in reducing NTSC interference. One feature of the instant invention is that it utilizes knowledge of the entire interference spectrum in order to design the rejection filter. The prior art comb filter or the rejection filter described in the '471 application both basically use the knowledge of the position of the picture, sound and color carriers only.

The invention provides the optimum filter performance in terms of NTSC rejection for a given amount of noise enhancement. The embodiment described herein provides an NTSC rejection of about 12.06 db for a noise enhancement of about 0.25 db with the NTSC color bar signal. The preferred embodiment described herein is also relatively insensitive to the nature of the input NTSC signal and gives good NTSC rejection for signals other than the color bar signal.

Another feature of the invention is that since the filter is formulated as a predictor, the output will be maximally white. The filter output can be further "whitened" by use of an interleaver as described in the '471 application incorporated by reference herein.

A further feature of the filter designed in accordance with the invention is that it is causal and monic and can be used to precode the data at the transmitter as suggested in the '773 patent application.

Still another feature of the invention is that the design method it comprises is independent of the modulation format of the digital signal and could be used for non-VSB transmission (QAM) modalities, for example quadrature amplitude modulation transmission as well.

Another feature of the invention is that the digital signal need not be offset by 45.8 kHz as is presently required in the 8VSB system designed by Zenith.

DETAILED DESCRIPTION OF A PREFERRED EMBODIMENT OF THE INVENTION

Figure 1:
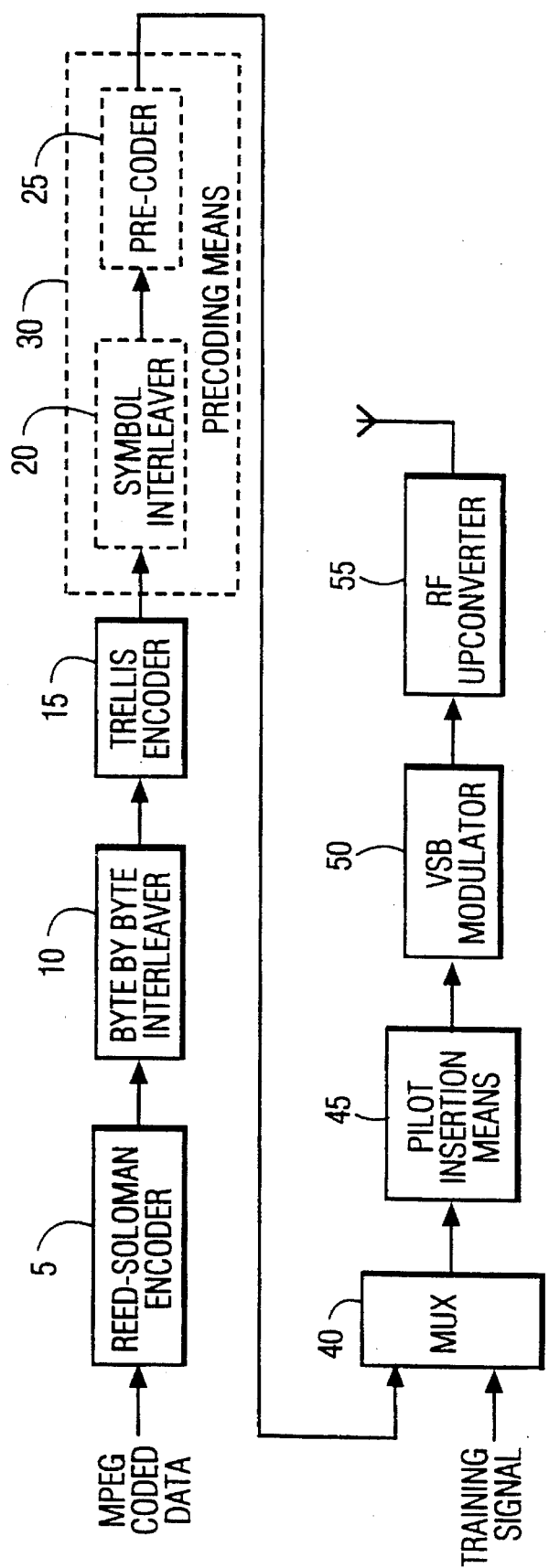
FIG. 1 describes a block diagram of a VSB transmitter for use with the invention.

FIG. 1 describes a Zenith VSB transmitter (as described in "VSB Transmission System: Technical Details" which has been modified in accordance with the invention.

The MPEG coded data (or, more generally, digital television data)is processed by the Reed-Solomon (RS) encoder 5, the byte interleaver 10 and then the trellis encoder 15. These three blocks are well-known and described, for example, in "VSB Transmission System: Technical Details".

The symbol interleaver 20 randomizes the trellis-coded symbols before they are processed by the pre-coder 25. The symbol interleaver 20 can be implemented as a block interleaver or as a convolutional interleaver; both implementations are described in U.S. Pat. No. 3,652,998 which is incorporated by reference herein.

Figure 5:
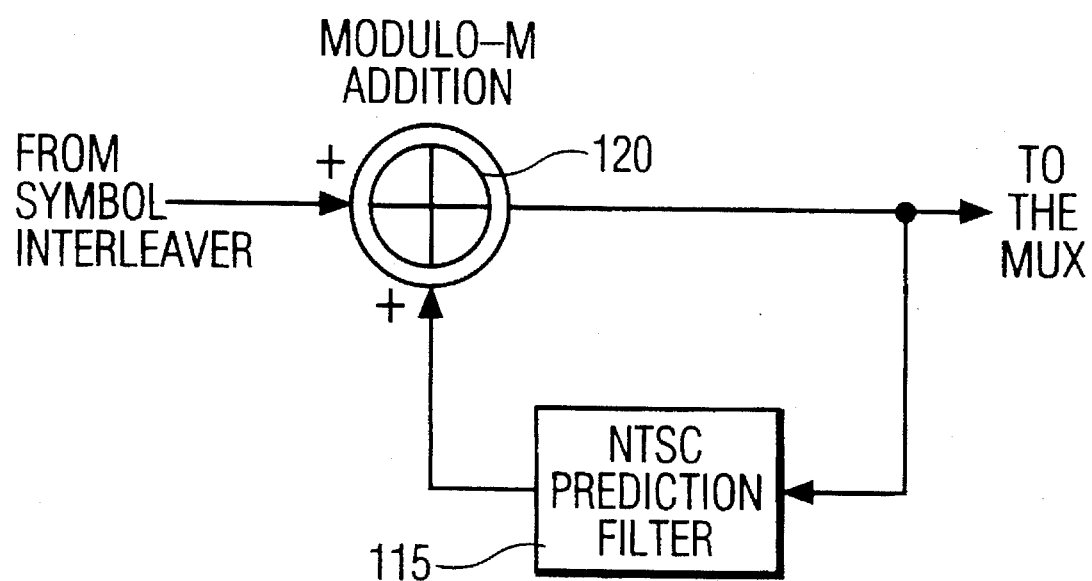
FIG. 5 describes the pre-coder located at the transmitter illustrated in FIG. 1.

The implementation of the pre-coder 25 is described in the patent application U.S. Ser. No. 08/197,773 which is incorporated by reference herein. A design for pre-coder 25 is shown in FIG. 5. The output of the symbol interleaver 20 is passed through a modulo-M adder 120, which adds its output passed through an NTSC prediction filter 115 like the one at the receiver. The operation of the modulo-M adder 120 is described in "New Automatic Equalizer Employing Modulo Arithmetic", Electronic Letters, pages 138–139, in March 1971, where the value of M is chosen to be greater than or equal to the peak value of the incoming symbol.

The output of the pre-coder 25 is passed through a multiplexer (MUX) 40, which multiplexes with the output of pre-coder 25, any training signals that are used.

A pilot signal is inserted into the multiplexed data stream by pilot insertion means 45 and the multiplexed data stream with pilot is then passed through a VSB modulator 50 and RF upconverter 55, after which it is transmitted over a communications path, for example a terrestrial broadcast channel.

The blocks 40, 45, 50, 55 are described in detail in "VSB Transmission System: Technical Details" and "Digital Spectrum Compatible—Technical Details" which are both incorporated by reference herein.

Figure 2:
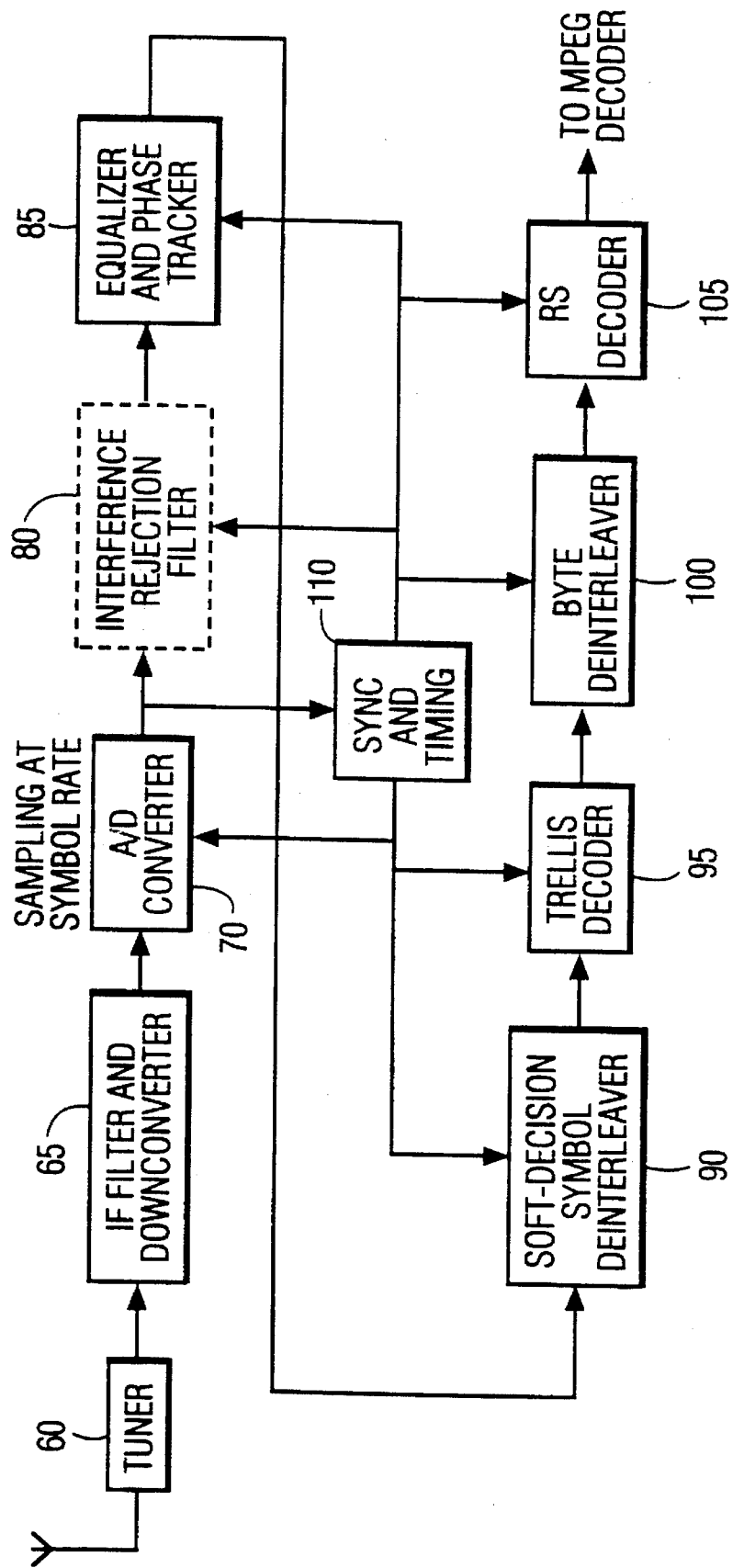
FIG. 2 describes a block diagram of a VSB receiver for use with the invention.

FIG. 2 is a block diagram of a VSB receiver comprising the invention.

Tuner 60 selects the channel of interest and converts the received signal from RF to IF, where the IF filter and down converter 65 can be, for example, a Surface Acoustic Wave (SAW) filter (which shapes the signal spectrum according to the filter used in the VSB modulator 50) followed by a mixer which down converts the shaped signal to a baseband signal as explained in greater detail in "Digital Spectrum Compatible—Technical Details".

Analog-to-digital (A/D) converter 70 samples the down-converted signal from IF filter and down-converter 65 at symbol-rate which is, for example, 10.76 MHz. The interference rejection filter 80, which is described in more detail in FIG. 3, then processes the sampled signal and passes it to the equalizer and phase tracker 85.

The soft-decision symbol interleaver 90 essentially performs the inverse operation of the symbol interleaver 20, except that the symbols have "soft" decision information as described in "Principles of Digital Communication and Coding" which is incorporated by reference herein.

The output of the symbol deinterleaver 90 is then passed through a trellis decoder 95, a byte deinterleaver 100 and the RS decoder 105 which are described in "VSB Transmission System: Technical Details". Sync and timing block 110 controls the clocking for each of the digital signal processing blocks and also the A/D converter 70.

Figure 3:
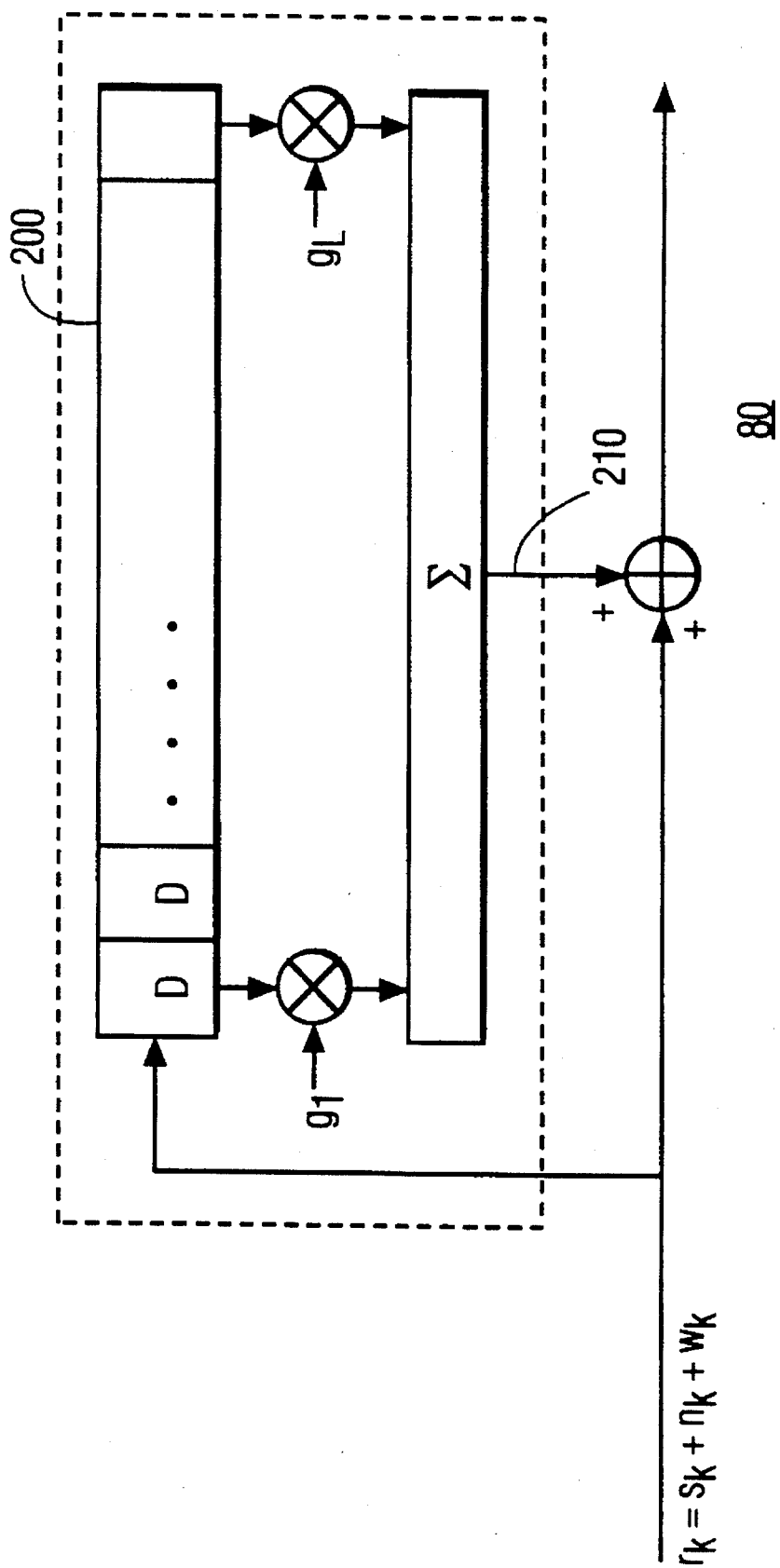
FIG. 3 shows the structure of an NTSC interference rejection filter comprising the invention.

An optimal NTSC interference rejection filter in accordance with the invention for use in a VSB receiver (for example interference rejection filter 80 of FIG. 2) is shown in FIG. 3. It comprises an L-tap delay line 200 where each delay D is equal to one symbol interval, which is the reciprocal of the A/D sampling rate of 10.76 Mhz.

The interference rejection filter 80 is a first order predictor, that is the first tap is 1 and all the other taps have a smaller magnitude than the first tap.

The coefficients of the interference rejection filter 80 ($g_1$ to $g_L$) are selected as follows. The input signal corrupted with AWGN and cochannel interference, is present at the input to the A/D converter 70. The digital output signal of the A/D converter 70, which will be denoted hereinafter as $r_k$, is equal to: $s_k+n_k w_k$, where $s_k$ is the transmitted symbol of the desired digital signal (precoded at the transmitter for example), $n_k$ is the NTSC interference, $w_k$ is the AWGN. $\sigma^2_w$ represents the variance of the AWGN which varies inversely to the signal to noise ratio and k represents the time index of the signal sampled at the A/D sampling rate. The goal of the filtering operation on $r_k$ is to reduce the variance of the interference $n_k$ at the filter output 210, while keeping the noise variance $\sigma^2_w$ as small as possible. Assuming $n_k$ to be wide-sense-stationary, we can define the interference correlation matrix $R_n$ as follows:

$$Rn(i,j)=E[n_k n_{k+i-j}].$$

In practice E, the ensemble average, are replaced by the time average, in order to form $R_n$. The filter is denoted by the vector $[g_0 g_1 \ldots g_L]^T$ where L+1 is the length of the filter and T denotes transpose. The first coefficient $g_0$ is intentionally set equal to 1 in order to force the filter to be causal. Causality is a constraint that is important if precoding is essential at the transmitter, for example a precoder 25 for use in a VSB transmitter, which is designed in accordance with the invention. In accordance with this invention, the coefficients used in the interference rejection filter 80 at the receiver are also used in the pre-coder 25 at the transmitter.

If we us consider the effects of filtering on the interference and noise, in accordance with the invention, the filter can be expressed as the partitioned vector [1 $g^T$] where $g^T=[g_1\ g_2 \ldots g_L]$. The variance of the NTSC interference, J, at the output of the filter is represented as:

$$J = [1\ g^T] R_n \begin{bmatrix} 1 \\ g \end{bmatrix}$$

and the variance of the noise at the output of the filter 80 is represented as:

$$\sigma^2_w(1+g^T g).$$

The criterion used for determining the filter g comprises the following steps:

Minimize J with respect to g subject to the constraint $g^T g = K$, where K is some constant determining the allowable noise enhancement. For example if a noise enhancement of 0.3 db is allowed, the value of K is 0.07. The minimization of J can be carried out in a straightforward manner by one skilled in the art using Lagrange multipliers. $R_n$ is first rewritten in a partitioned form as follows:

$$R_n = \begin{bmatrix} a & b^T \\ b & C \end{bmatrix}$$

where b is a L×1 vector and C is a L×L matrix. Then, the minimization criterion can be written as:

Minimize $a+2g^T b+g^T C g+\lambda(g^T g-K)$ with respect to g and $\lambda$.

This minimization reduces to solving the following two equations for g and $\lambda$, where $\lambda$ is the Lagrange multiplier:

$$g=(C+\lambda I)^{-1}b, \text{ and } g^T g=K,$$

where I is an L×L identity matrix.

These equations cannot be solved in closed form for g but can be fairly easily solved for a given k by computing $f(\lambda)=b^T(C+\lambda I)^{-2}b$ as a function of $\lambda$ and picking a value of $\lambda$ for which $f(\lambda)=k$. Once $\lambda$ is known, g can be calculated from $g=(C+\lambda I)^{-1}b$.

From the above, it is apparent that the filter coefficients are heavily dependent on the nature of the correlation matrix $R_n$ and hence the question arises as to what is a representative NTSC signal correlation matrix. For this example, the NTSC color bar signal was chosen. The signal was sampled at 10.76 Mhz which is the symbol frequency for Zenith's 8VSB system. The correlation values were evaluated by time averaging and performing the the series of steps described above for a filter having a length of 37 (i.e. L=36).

Figure 4:
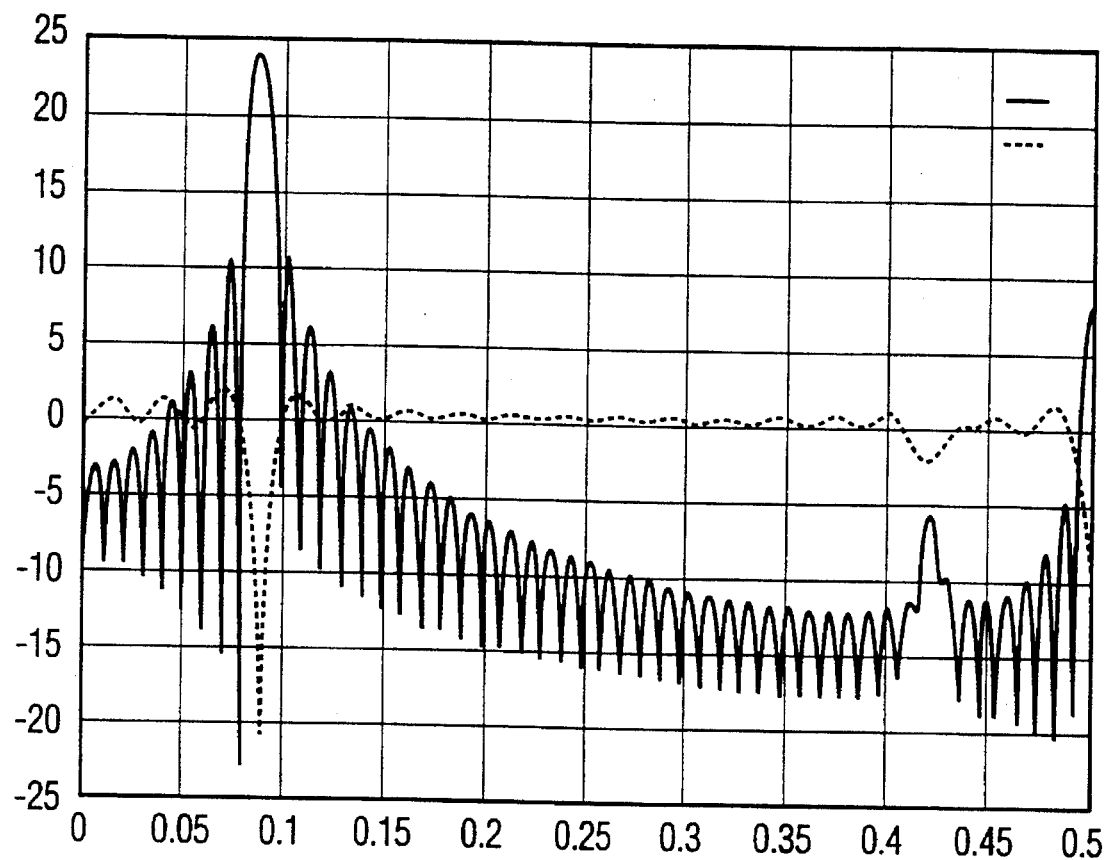
FIG. 4 graphically compares the frequency response of the NTSC rejection filter of FIG. 3 and the NTSC color bar spectrum.

The filter thus obtained has the coefficients shown in Table 1. This filter has a noise enhancement of 0.25 db and NTSC rejection of 12.06 db. The frequency response of this filter is shown in FIG. 4 and has notches at the picture, chroma and sound carriers where most of the NTSC energy is located. In fact, the rejection with another NTSC signal, the 'text over tulips' signal, is 12.58 db. Hence, even though this filter has been designed for rejecting the color bar signal, its response is general enough to reject other NTSC signals quite well also.

TABLE 1

| Filter coefficients for NTSC rejection filter | |
| --- | --- |
| Tap No. | Tap Value |
| 1 | 1.0000 |
| 2 | −0.0161 |
| 3 | −0.0561 |
| 4 | 0.0272 |
| 5 | 0.0289 |
| 6 | 0.0594 |
| 7 | 0.0599 |
| 8 | 0.0444 |
| 9 | 0.0093 |
| 10 | 0.0003 |
| 11 | −0.0655 |
| 12 | −0.0228 |
| 13 | −0.0869 |
| 14 | 0.0009 |
| 15 | −0.0372 |
| 16 | 0.0445 |
| 17 | 0.0275 |
| 18 | 0.0592 |
| 19 | 0.0402 |
| 20 | 0.0283 |
| 21 | −0.0079 |
| 22 | −0.0144 |
| 23 | −0.0627 |
| 24 | −0.0220 |
| 25 | −0.0673 |
| 26 | 0.0143 |
| 27 | −0.0205 |
| 28 | 0.0556 |

TABLE 1-continued

Filter coefficients for NTSC rejection filter

| Tap No. | Tap Value |
|---|---|
| 29 | 0.0254 |
| 30 | 0.0569 |
| 31 | 0.0228 |
| 32 | 0.0159 |
| 33 | −0.0224 |
| 34 | −0.0240 |
| 35 | −0.0598 |
| 36 | −0.0200 |
| 37 | −0.0500 |

I claim:

1. A transmitter for transmitting a digital television signal to a television receiver, said television receiver comprising:
 a) means for receiving a digital television signal accompanied by noise, and an interference component resulting from a co-channel signal; and
 b) an interference rejection filter for reducing the effect of said interference component on said digital television signal,
 wherein said interference rejection filter flattens the frequency spectrum of the co-channel signal and minimizes the energy of the interference component while simultaneously limiting enhancement of the noise due to the interference rejection filter to a specified level, said interference filter using a plurality of coefficients, said transmitter comprising a precoder which precodes said digital signal prior to its transmission using said plurality of coefficients.

2. A television receiver comprising:
 a) means for receiving a precoded digital television signal accompanied by noise and an interference component resulting from a co-channel signal; and
 b) an interference rejection filter for reducing the effect of said interference component on said precoded digital television signal,
 wherein said interference rejection filter is a digital filter defined by a plurality of coefficients that flatten the frequency spectrum of the co-channel signal and minimize the energy of the interference component while simultaneously constraining enhancement of the noise due to the interference rejection filter to a specific level,
 wherein said precoded digital television signal is precoded using said plurality of coefficients, and
 wherein said plurality of coefficients have been predetermined by producing a correlation matrix of signal samples taken from an interference signal that includes noise and using said correlation matrix to compute optimum coefficients for said interference rejection filter while constraining noise enhancement by said interference rejection filter to a specified value.

* * * * *